(12) United States Patent
Citti et al.

(10) Patent No.: US 8,236,719 B2
(45) Date of Patent: Aug. 7, 2012

(54) SINTERED AND DOPED PRODUCT BASED ON ZIRCON + $NB_2O_5$ OR $TA_2O_5$

(75) Inventors: Olivier Citti, Wellesley, MA (US); Julien Fourcade, Shrewsbury, MA (US)

(73) Assignee: Saint-Gobain Centre de Recherches et d'Etudes European, Courbevoie (FR)

( * ) Notice: Subject to any disclaimer, the term of this patent is extended or adjusted under 35 U.S.C. 154(b) by 515 days.

(21) Appl. No.: 12/442,864

(22) PCT Filed: Oct. 15, 2007

(86) PCT No.: PCT/IB2007/054195
§ 371 (c)(1),
(2), (4) Date: Oct. 13, 2009

(87) PCT Pub. No.: WO2008/047298
PCT Pub. Date: Apr. 24, 2008

(65) Prior Publication Data
US 2010/0089098 A1 Apr. 15, 2010

(30) Foreign Application Priority Data
Oct. 16, 2006 (FR) .................................. 06 54304

(51) Int. Cl.
*C04B 35/484* (2006.01)
(52) U.S. Cl. ........................................ 501/106; 501/107
(58) Field of Classification Search .................. 501/106, 501/107
See application file for complete search history.

(56) References Cited

U.S. PATENT DOCUMENTS

| | | | |
|---|---|---|---|
| 3,899,341 A | 8/1975 | Schwarz | |
| 4,883,781 A * | 11/1989 | Watanabe et al. | 501/102 |
| 4,886,768 A | 12/1989 | Tien | |
| 5,124,287 A | 6/1992 | Wehrenberg et al. | |
| 5,432,016 A | 7/1995 | Wada et al. | |
| 5,556,816 A | 9/1996 | Kim et al. | |
| 6,380,113 B1 | 4/2002 | Kim et al. | |
| 7,655,587 B2 * | 2/2010 | Boussant-Roux et al. | 501/105 |
| 7,687,422 B2 * | 3/2010 | Boussant-Roux et al. | 501/105 |
| 7,910,508 B2 * | 3/2011 | Gaubil et al. | 501/106 |
| 2010/0257901 A1* | 10/2010 | Cabodi et al. | 65/374.13 |
| 2011/0107796 A1* | 5/2011 | Citti et al. | 65/134.1 |
| 2011/0212826 A1* | 9/2011 | Cabodi et al. | 501/104 |

FOREIGN PATENT DOCUMENTS

| | | |
|---|---|---|
| DE | 41 20 244 A1 | 1/1992 |
| EP | 0 388 747 A2 | 9/1990 |
| EP | 0 952 125 A1 | 10/1999 |
| WO | WO 02/44102 A1 | 6/2002 |
| WO | WO 2006/073841 AI | 7/2006 |
| WO | WO 2006108945 A1 * | 10/2006 |

* cited by examiner

*Primary Examiner* — Karl Group
(74) *Attorney, Agent, or Firm* — Oliff & Berridge, PLC

(57) ABSTRACT

Sintered product produced from a starting charge containing 75 to 99% zircon, and having the following average chemical composition by weight, the percentages by weight being based on the oxides: 60%<$ZrO_2$+$HfO_2$<75%; 27%<$SiO_2$<34%; O<$TiO_2$; O<$Y_2O_3$<3.5%; 0.1%<$Nb_2O_5$+$Ta_2O_5$<=5%; and other oxides: <1.5%; for a total of 100%, The sintered product may be used in a glass furnace.

34 Claims, No Drawings

SINTERED AND DOPED PRODUCT BASED ON ZIRCON + $Nb_2O_5$ OR $Ta_2O_5$

The invention relates to novel sintered materials produced from zircon, to a process for manufacturing them and to their use in a glass furnace.

Among refractory products, a distinction is made between fused-cast products and sintered products.

Unlike sintered products, fused-cast products usually include a highly abundant intergranular glass phase that fills the network of crystallized grains. The problems encountered by sintered products and by fused-cast products in their respective applications and the technical solutions adopted for solving them are therefore generally different. Moreover, owing to the considerable differences between the manufacturing processes, a composition developed for manufacturing a fused-cast product cannot a priori be used as such for manufacturing a sintered product, and vice versa.

Sintered products are obtained by mixing suitable raw materials, then forming this mixture in the green state, before firing the resulting green form at a temperature and for a time that are sufficient to sinter this green form.

Depending on their chemical composition and their method of production, sintered products are intended for a very wide variety of industries.

A sintered product suitable for one particular application will therefore not a priori possess the properties needed for being used in another application in which the temperature, corrosion or abrasion conditions are different.

For example, U.S. Pat. No. 3,899,341 describes sintered products produced from zircon (50-90%) and zirconia. The zirconia is partially stabilized in order to limit elastic deformation of the products, which leads to cracking. However, the products in U.S. Pat. No. 3,899,341 are designed to be used in contact with molten steel. They are therefore not a priori suitable for being used in contact with a molten glass.

Among sintered products, dense products produced from zircon (zirconium silicate: $ZrO_2.SiO_2$ or $ZrSiO_4$) and optionally zirconia (zirconium oxide: $ZrO_2$) may be used in applications in which they are directly in contact with molten glass, in particular in the case of non-alkaline glasses.

EP 952125 thus describes sintered products intended for glass furnaces and produced from zircon (5-40%) and zirconia. These products also contain titanium, aluminium and yttrium oxides, allowing large crack-free blocks to be produced. The $SiO_2$ content of these products is less than 14% while their $ZrO_2$ +$HfO_2$ content is greater than 82%.

WO 02/44102 describes "isopipes" used for the manufacture of glass sheets. The isopipes comprise more than 95% zircon by weight and, unless they also contain between 0.2 et 0.4% titanium oxide, their creep behaviour is insufficient. To illustrate the prior art, WO 02/44102 cites U.S. Pat. No. 5,124,287.

U.S. Pat. No. 5,124,287 describes compositions containing 75 to 95% zircon and titanium oxide that are intended to be in contact with molten glass. The presence of titanium oxide is considered to be favourable to the densification of the products obtained after sintering. In the end product, the zirconia must be unstabilized and it is therefore preferable to use unstabilized zirconia in the starting mixture. However, the use of stabilized zirconia, for example with zirconia stabilizers such as yttrium oxide or calcium oxide, is not unacceptable since heating the mixture causes the zirconia to be destabilized.

WO 2006/073841 describes refractory materials intended for the glass industry. These zircon-based materials may contain $Y_2O_3$. They always contain at least 1% $P_2O_5$ or $V_2O_5$.

The creep of a material under the action of a stress (compressive, tensile or flexural stress) may be defined as the ability of the material to be plastically deformed, that is to say permanently deformed, under the effect of this load. In refractory ceramics, the creep is in general thermally activated, that is to say increasing the temperature tends to increase the creep rate of the material.

In certain glass applications, and in particular for forming glass sheets, creep must be limited as far as possible since this may induce deformation of the refractory block that makes it difficult for the glass sheet to meet the dimensional specifications and results in a substantial drop in yield for the glass producer.

There therefore exists a need for a product having improved creep resistance and able to be used in glass furnaces. The present invention aims to satisfy this need.

To this end, the invention proposes a sintered product produced from a starting charge containing 75 to 99% zircon, and having the following average chemical composition by weight, the percentages by weight being based on the oxides:

$60\% \leq ZrO_2+HfO_2 \leq 75\%$;

$27\% \leq SiO_2 \leq 34\%$;

$0 \leq TiO_2$;

$0 \leq Y_2O_3 \leq 3.5\%$;

$0.1\% \leq Nb_2O_5+Ta_2O_5 \leq 5\%$; and

Other oxides: $\leq 1.5\%$ for a total of 100%.

As we will see later, this sintered refractory product has an improved creep resistance with respect to the products described hitherto. Advantageously, it also has a high density, equivalent to or higher than the known products.

Preferably, the product according to the invention also has one or more of the following optional features:

- $Ta_2O_5 > 0.00\%$, preferably $Ta_2O_5 \geq 0.1\%$, preferably $Ta_2O_5 \geq 0.25\%$, in percentages by weight on the basis of the oxides;
- In an embodiment, $Nb_2O_5 \leq 1\%$, preferably $Nb_2O_5 \leq 0.5\%$, preferably $Nb_2O_5 \leq 0.3\%$, or even $Nb_2O_5$ 5 $0.25\%$, in percentages by weight on the basis of the oxides; In one embodiment $Nb_2O_5 \leq 0.05\%$. The product of the invention may also not contain any $Nb_2O_5$.
- $TiO_2 < 1.5\%$, preferably $TiO_2 < 1\%$, more preferably $TiO_2 < 0.5\%$, even more preferably $TiO_2 < 0.15\%$ and even more preferably still $TiO_2 < 0.10\%$ in percentages by weight on the basis of the oxides. $TiO_2$ may even be an impurity;
- the total content of oxides $Nb_2O_5$ and $Ta_2O_5$, preferably the content of at least one of these oxides, and in particular the content of $Ta_2O_5$, is greater than 0.2%, preferably greater than 0.3%, preferably greater than 0.5% and more preferably greater than 0.8%, in percentages by weight on the basis of the oxides;
- the total content of the oxides $Nb_2O_5$ and $Ta_2O_5$, preferably the content of at least one of these oxides, and in particular the content of $Ta_2O_5$, is less than 4% or 3%, preferably less than 2%, preferably less than 1.7%, preferably less than 1.5% and more preferably less than 1%, in percentages by weight on the basis of the oxides;
- $SiO_2 \geq 30\%$;
- $ZrO_2+HfO_2 \leq 72.9\%$ or $ZrO_2+HfO_2 \leq 70\%$;
- the "other oxides" are impurities—preferably the content of "other oxides" is less than 1.2%, more preferably less than 1%, even more preferably less than 0.7%, even more preferably less than 0.5% and more preferably still less than 0.2%, in percentages by weight on the basis of the oxides;

$P_2O_5$<1%, preferably $P_2O_5$<0.9%, more preferably $P_2O_5$<0.5%, even preferably $P_2O_5$<0.3%, and even more preferably still $P_2O_5$<0.2%, in percentages by weight on the basis of the oxides;

$V_2O_5$<1%, preferably $V_2O_5$<0.9%, more preferably $V_2O_5$<0.5%, even preferably $V_2O_5$<0.3%, and even more preferably still $V_2O_5$<0.2%, in percentages by weight on the basis of the oxides;

$Al_2O_3$<1%, preferably $Al_2O_3$<0.6%, more preferably $Al_2O_3$<0.4%, in weight on the basis of the oxides;

CaO<0.1%, preferably CaO<0.05%, in percentages by weight on the basis of the oxides;

$Fe_2O_3$<0.2%, preferably $Fe_2O_3$<0.08%, in percentages by weight on the basis of the oxides;

the zircon content in the starting charge is greater than or equal to 80%, preferably greater than 90%, preferably greater than 95%, as percentages by weight on the basis of the oxides;

the product of the invention has the form of a block, at least one of the dimensions of which, preferably all the dimensions of which, are greater than 100 mm. In particular, the block may be square or rectangular shaped;

the product of the invention contains more than 80% by weight of zircon ($ZrSiO_4$);

the apparent porosity is more than 2%, or more than 4%;

the apparent porosity is less than 15%, or less than 10% or even less than 8%;

In one embodiment, the zirconia content in the product is greater than 5%, preferably greater than 10%, and/or less than 15%, in percentages by weight on the basis of the oxides.

In one embodiment, the $Y_2O_3$ content may be greater than 0.05%, greater than 0.10%, greater than 0.15% and even greater than 0.5%, in percentages by weight on the basis of the oxides. The zirconia in the product may be at least partially stabilized with yttrium oxide, the percentage by weight of stabilized zirconia being greater than 10%, preferably greater than 20%, of the zirconia.

The yttrium oxide content $Y_2O_3$ is preferably less than 3%, preferably less than 1.7% and more preferably less than 1%, in percentages by weight on the basis of the oxides. Advantageously, a significant modification of the crystalline phases is thus avoided, as are therefore the risks of feasibility problems associated with an increase in rigidity.

The invention also relates to a process for manufacturing a sintered product comprising the following steps:

a) raw materials are mixed to form a starting charge;
b) a green part is formed from said starting charge; and
c) said green part is sintered so as to obtain said sintered product, said process being noteworthy in that the starting charge is determined in such a way that said product is in accordance with the invention.

Preferably, zircon and optionally zirconia are added in step a) in amounts such that the total of the zircon and zirconia contents represents at least 95% of the starting charge, as a percentage of the weight on the basis of the oxides.

In one embodiment, in step a), monoclinic zirconia and/or at least 1% of silica are added to the starting charge, in percentages by weight on the basis of the oxides.

Optional yttrium oxide, provided with the zirconia or provided separately, may also be added to the starting charge. At least 1% yttrium oxide, in percentages by weight on the basis of the oxides, may be added.

In an embodiment, no $Y_2O_3$, associated with zirconia or provided separately, is added to the starting charge. However $Y_2O_3$ may still be an impurity.

Preferably, in step a) one or more of the oxides $Nb_2O_5$, and $Ta_2O_5$, are intentionally (that is to say systematically and methodically) added in amounts guaranteeing that the sintered product obtained in step e) is in accordance with the invention.

The invention also relates to the use of a refractory product according to the invention, or one manufactured using a process according to the invention, in a glass furnace, in particular in furnace zones that are in contact with molten glass.

The invention finally relates to such a glass furnace.

In the present description and in accordance with the usage, "zirconia" refers to $ZrO_2$ molecules that are not associated with $SiO_2$ molecules to form zircon. Likewise, "silica" refers to $SiO_2$ molecules that are not associated with $ZrO_2$ molecules to form zircon.

The term "impurities" is understood to mean inevitable constituents, necessarily introduced with the raw materials or resulting from reactions with these constituents.

Unless mentioned otherwise, all the percentages are percentages by weight on the basis of the oxides.

The zircon may be provided by zircon sand (natural or synthetic, optionally milled) or else a chamotte of dense products having a high zircon content. The composition according to the invention, determined by chemical analysis, supplies only the overall $SiO_2$ and $ZrO_2$ contents, without distinguishing the corresponding zircon contents.

According to the invention, it is essential for the starting charge to contain at least 75%, preferably at least 80%, zircon. The advantageous properties of the product according to the invention would in fact not be achieved if the amounts of $SiO_2$ and $ZrO_2$ provided by the zircon according to the invention were provided in the form of silica and zirconia.

Preferably, the total of the zircon and zirconia contents represents at least 95% of the starting charge.

The zirconia-containing raw materials also contain small amounts of $HfO_2$ (1.5 to 2%) and, according to the usual practice, these two oxides are not distinguished from each other.

Zirconia exhibits large dilatometric variations due to its change of crystallographic state at high temperature. To limit these dilatometric variations, in particular in large blocks, it is necessary to limit the zirconia content. The starting charge must therefore contain less than 25% zirconia, this being provided by having a zircon content of at least 75%.

In one embodiment, the zirconia in the product according to the invention is at least partially stabilized with yttrium oxide, the percentage by weight of stabilized zirconia being greater than 10% of the zirconia. For this purpose, the zirconia must be introduced in unstabilized form and the yttrium oxide must be added to the starting charge separately.

According to the invention, the presence of niobium and/or tantalum oxide improves the creep resistance of the zircon-based refractory product. Advantageously, this also avoids having to add titanium oxide. This is because titanium oxide is known by those skilled in the art as being an additive that promotes bubbling of the zircon in very many specialty glasses. It is therefore desirable to limit the concentration of this sintering additive.

If zirconia is added to the starting charge, it is possible to use yttrium-oxide-stabilized zirconia to provide the yttrium oxide. As explained above, the yttrium oxide is preferably added to the starting charge independently of the zirconia so as to promote, at least partly, the stabilization of the zirconia in the product according to the invention.

However, it is desirable to limit the amount of yttrium oxide in order to avoid dissociation of the zircon at high temperature. The yttrium oxide content is therefore limited to 3.5%.

The $SiO_2$ content of the product according to the invention corresponds to the $SiO_2$ content of zircon and to free silica. In one embodiment, at least 1% of silica is added to the starting charge so as to promote the onset of densification at lower temperatures than would be needed to densify pure zircon.

The "other oxides" are oxides such as $Na_2O$, $Al_2O_3$, $P_2O_5$ or $Fe_2O_3$. The contents of $Na_2O$ (which promotes the dissociation of zircon) and of $Fe_2O_3$ must be minimized. Preferably, these oxides are impurities provided by the raw materials, which oxides are not necessary constituents but are merely tolerated. At contents of less than 1.5%, it is considered that the effect of these "other oxides" does not substantially modify the result obtained.

Preferably, the content of each of the abovementioned oxides in the sintered product according to the invention is less than 0.5%, more preferably less than 0.3% and more preferably still less than 0.15% in percentages by weight on the basis of the oxides.

The following non-limiting examples are given for the purpose of illustrating the invention.

In these examples, the raw materials employed (the percentages given being percentages by weight) were chosen from:
  zircon sand containing 66.8% $ZrO_2+HfO_2$, 32.7% $SiO_2$, 0.2% $Al_2O_3$ and 0.1 $TiO_2$;
  titanium oxide containing 96.6% $TiO_2$, 1.7% $Fe_2O_3$, 0.8% $SiO_2$ and 0.6% $Al_2O$ (for reference only);
  niobium oxide with a purity of greater than 99.9%, having particles with a median diameter ($D_{50}$) of about 15 μm (example 2) or about 1 μm (examples 13, 14);
  tantalum oxide with a purity of greater than 99.9%, having particles with a median diameter ($D_{50}$) of about 15 μm (examples 3, 4) or about 1 μm (examples 6-14);
  yttrium oxide with a purity of greater than 99.9%, having particles with a median diameter of 3 to 4 μm;
  phosphoric acid (85% aqueous $H_3PO_4$ solution); and
  crystalline silica containing more than 98% $SiO_2$ and having a median diameter ($D_{50}$) of about 10 μm.

Sintered refractory blocks were manufactured according to a process conventionally comprising the following steps:
  a') milling of the zircon sources and other raw materials;
  b') mixing of the raw materials to form the starting charge;
  c') forming of a green part from said mixture; and
  d') sintering of said green part.

Step a') makes it possible to achieve the conventional particle size characteristics required for good subsequent densification of the material. For the examples described here, the powders thus prepared had a median diameter ($D_{50}$) of less than 5 μm.

In step b'), all the raw materials were metered so that the mixture had the desired mean chemical composition by weight and then mixed in the presence of one or more deflocculants and/or binders conventionally used in zircon sintering processes, for example phosphoric acid.

The mixture of the raw materials could optionally be spray dried before passing to step c').

In step c'), the mixture was then formed by isostatic pressing so as to produce blocks of the desired size (100×100×150 mm).

Other techniques, such as slip casting, uniaxial pressing, casting of a gel, vibro-casting, or a combination of these techniques, could be used.

In step d'), the green part was then sintered in air, at atmospheric pressure and at a temperature between 1400° C. and 1700° C., so as to produce a dense refractory block.

Examples 1 to 4 where prepared in the same sintering batch. Examples 5 to 14 were prepared together in the same conditions but in another sintering batch.

Specimens were removed from the various blocks produced, so as to carry out characterization tests.

In an "isothermal" creep test, a four-point bending test configuration was used (the distance of L between the outer supports was 80 mm and the distance l between the inner supports was 40 mm). A strip measuring 8 mm×9 mm×100 mm was placed on these supports and a stress of 2 MPa was applied at the centre of the strip, the temperature being kept constant and equal to 1275° C. or 1180° C. The change in sag (in mm) of the strip over 50 hours was recorded. The mean deformation rate ($V_d$), given in mm/mm/hour, was then calculated.

The density was determined on three weighings of each specimen. A first weighing, of the dry specimen (after drying at 110° C.), gave the weight $W_{dry}$. Next, a wet specimen was prepared by taking a specimen that had been under vacuum for 30 minutes and then immersed in water so as to impregnate the accessible pore volume of the material. Weighing this wet specimen gave the weight $W_{wet}$. Finally, weighing the specimen in water gave $W_{water}$.

$W_{wet}-W_{water}$ provides a measure of the total volume of the specimen excluding accessible porosity. The bulk density of the material corresponds to the ratio of the $W_{dry}/(W_{wet}-W_{water})$.

The apparent porosity is deduced from these measurements considering that the difference $W_{wet}-W_{dry}$ corresponds to the volume of the open porosity infiltrated with water. The ratio $W_{wet}-W_{dry}/(W_{wet}-W_{water})*100$ gives the apparent porosity proportion.

The composition of the mixture of raw materials is indicated in Table 1 (in percentages by weight on the basis of the mixture).

The reference products are products 1 and 5.

TABLE 1

| No. | Zircon sand (%) | Silica (%) | Titanium oxide (%) | Yttrium oxide (%) | Additive | Additive (%) | Phosphoric acid (%) |
|---|---|---|---|---|---|---|---|
| 1 | 98.1 | 1.3 | 0.3 | / | / | / | 0.3 |
| 2 | 97.3 | 1.4 | / | / | $Nb_2O_5$ | 1 | 0.3 |
| 3 | 97.4 | 1.3 | / | / | $Ta_2O_5$ | 1 | 0.3 |
| 4 | 95.8 | 1.4 | / | 1.5 | $Ta_2O_5$ | 1 | 0.3 |
| 5 | 99.5 | / | 0.2 | | | | 0.3 |
| 6 | 99.45 | / | / | / | $Ta_2O_5$ | 0.25 | 0.3 |
| 7 | 99.2 | / | / | / | $Ta_2O_5$ | 0.5 | 0.3 |
| 8 | 98.95 | / | / | / | $Ta_2O_5$ | 0.75 | 0.3 |
| 9 | 98.7 | / | / | / | $Ta_2O_5$ | 1 | 0.3 |

TABLE 1-continued

| No. | Zircon sand (%) | Silica (%) | Titanium oxide (%) | Yttrium oxide (%) | Additive | Additive (%) | Phosphoric acid (%) |
|---|---|---|---|---|---|---|---|
| 10 | 98.2 | / | / | / | $Ta_2O_5$ | 1.5 | 0.3 |
| 11 | 96.7 | / | / | / | $Ta_2O_5$ | 3 | 0.3 |
| 12 | 99.45 | / | / | / | $Nb_2O_5$ | 0.25 | 0.3 |
| 13 | 98.7 | / | / | / | $Ta_2O_5$ $Nb_2O_5$ | 0.5 0.5 | 0.3 |
| 14 | 98.2 | / | / | / | $Ta_2O_5$ $Nb_2O_5$ | 1 0.5 | 0.3 |

The average chemical composition of the various products tested and the results of the tests are given in Table 2 (the percentages by weight being on the basis of the oxides). The content of minor oxides, such as $P_2O_5$, $Fe_2O_3$, etc., is not given in the table. The total content of minor oxides is less than 1%.

TABLE 2

| No. | $ZrO_2$+$HfO_2$ (%) | $SiO_2$ (%) | $TiO_2$ (%) | $Al_2O_3$ (%) | $Y_2O_3$ (%) | Additive | Additive (%) | $V_d$ (1275° C.) | $V_d$ (1180° C.) | Density (g/cm³) |
|---|---|---|---|---|---|---|---|---|---|---|
| 1 | 65.7 | 33.3 | 0.34 | 0.28 | 0.12 | / | | $1.3 \times 10^{-4}$ | | 3.72 |
| 2 | 65.0 | 33.2 | 0.11 | 0.29 | 0.11 | $Nb_2O_5$ | 0.89 | $5.2 \times 10^{-5}$ | | 4.21 |
| 3 | 64.8 | 33.1 | 0.11 | 0.29 | 0.12 | $Ta_2O_5$ | 0.92 | $4.6 \times 10^{-6}$ | $4.8 \times 10^{-7}$ | 3.97 |
| 4 | 64.3 | 33.0 | 0.12 | 0.29 | 0.57 | $Ta_2O_5$ | 0.96 | $7.8 \times 10^{-6}$ | | 3.78 |
| 5 | 64.4 | 33.3 | 0.38 | 0.30 | | / | | $1.5 \times 10^{-4}$ | $2.2 \times 10^{-5}$ | 3.92 |
| 6 | 64.3 | 33.2 | 0.16 | 0.30 | | $Ta_2O_5$ | 0.34 | $5.3 \times 10^{-5}$ | | 3.93 |
| 7 | 64.2 | 33.1 | 0.15 | 0.29 | | $Ta_2O_5$ | 0.52 | $5.0 \times 10^{-5}$ | | 4.00 |
| 8 | 64.6 | 33.1 | 0.16 | 0.29 | | $Ta_2O_5$ | 0.93 | $1.6 \times 10^{-5}$ | | 4.13 |
| 9 | 64.5 | 33.0 | 0.15 | 0.29 | | $Ta_2O_5$ | 1.13 | $1.4 \times 10^{-5}$ | | 4.21 |
| 10 | 64.2 | 32.8 | 0.15 | 0.29 | | $Ta_2O_5$ | 1.68 | $1.0 \times 10^{-5}$ | | 4.13 |
| 11 | 62.5 | 32.3 | 0.14 | 0.29 | | $Ta_2O_5$ | 2.74 | $8.4 \times 10^{-6}$ | | 4.26 |
| 12 | 64.3 | 33.2 | 0.16 | 0.30 | | $Nb_2O_5$ | 0.26 | | $4.5 \times 10^{-6}$ | 3.92 |
| 13 | 63.8 | 32.9 | 0.15 | 0.29 | | $Ta_2O_5$ $Nb_2O_5$ | 0.61 0.52 | | $1.4 \times 10^{-5}$ | 4.30 |
| 14 | 63.5 | 32.8 | 0.15 | 0.29 | | $Ta_2O_5$ $Nb_2O_5$ | 1.31 0.51 | | $5.2 \times 10^{-6}$ | 4.28 |

The examples show that the addition of $Nb_2O_5$ and/or $Ta_2O_5$ makes it possible for the creep deformation to be very significantly reduced. Advantageously, this reduction is possible whether or not the yttrium oxide has been added to the starting charge.

Moreover, it has also been found that the presence of $Nb_2O_5$ or $Ta_2O_5$ advantageously makes it unnecessary to add titanium oxide in order to obtain sufficient densification. This is because the density of the products of the invention is equivalent to or greater than that of the reference product.

Example 3, according to the invention, is preferred when maximum creep resistance is desired. A comparison between examples 3 and 4 shows that small additions of $Y_2O_3$ maintain a good resistance to creep deformation. For instance, the product according to the invention may contain at least 0.5% $Y_2O_3$ and at least 0.9% $Ta_2O_5$.

Examples 12 to 14 show the positive influence of $Nb_2O_5$ on the density. Example 13, according to the invention, is preferred when a maximum density is desired. However, high contents of $Nb_2O_5$ may lead to a decrease in the mechanical resistance of the product. When mechanical resistance is important, $Nb_2O_5$ content should be limited, preferably to values less than 1% or less than 0.5, or even less than 0.3%, especially when $Nb_2O_5$ is the sole additive. Its content should then preferably be less than 0.3% or less than or equal to 0.25%.

In an embodiment, the product according to the invention may contain at least 0.05% $Y_2O_3$ and at least 0.8% $Nb_2O_5$.

The best compromises between resistance to creep deformation and high density were obtained with $Ta_2O_5$ contents higher than 0.95%, preferably higher than or equal to 2% or 3%. Example 11 is regarded as the preferred embodiment. In this example, no $Nb_2O_5$ is added to the starting charge. In other words, it may be preferred that the product of the invention does not contain any $Nb_2O_5$, but as impurities.

Of course, the present invention is not limited to the embodiments described and represented, which are provided as illustrative and non-limiting examples.

The invention claimed is:

1. Sintered product produced from a starting charge containing 75 or more zircon, and having the following average chemical composition by weight, the percentages by weight being based on the oxides:
   60%<$ZrO_2$+$HfO_2$<75%;
   27%<$SiO_2$<34%;
   0<$TiO_2$;
   0<$Y_2O_3$<3.5%;
   0.1%<$Nb_2O_5$+$Ta_2O_5$<5%; and
   other oxides: <1.5%;
   for a total of 100%.

2. Sintered product according to claim 1 in which $Ta_2O_5$>0.1%.

3. Sintered product according to claim 2 in which $Ta_2O_5$>0.5%.

4. Sintered product according to claim 3 in which $Ta_2O_5$>0.8%.

5. Sintered product according to claim 1 in which $Nb_2O_5$<1%.

6. Sintered product according to claim 5 in which $Nb_2O_5$<0.5%.

7. Sintered product according to claim 6 in which $Nb_2O_5 < 0.3\%$.

8. Sintered product according to claim 7 in which $Nb_2O_5$ is an impurity.

9. Sintered product according to claim 1, in which $TiO_2 < 1.5\%$ as a percentage by weight on the basis of the oxides.

10. Sintered product according to claim 9, in which $TiO_2 < 0.5\%$ as a percentage by weight on the basis of the oxides.

11. Sintered product according to claim 10, in which $TiO_2 < 0.15\%$ as a percentage by weight on the basis of the oxides.

12. Sintered product according to claim 1, in which the total content of the oxides $Nb_2O_5$ and $Ta_2O_5$ is greater than 0.5% and less than 1.5%, in percentages by weight on the basis of the oxides.

13. Sintered product according to claim 1, in which the $Y_2O_3$ content is greater than 0.15% and less than 1.7%, in percentages by weight on the basis of the oxides.

14. Sintered product according to claim 13, in which the $Y_2O_3$ content is greater than 0.5% and less than 1%, in percentages by weight on the basis of the oxides.

15. Sintered product according to claim 1, in which the content of "other oxides" is less than 0.7% as a percentage by weight on the basis of the oxides.

16. Sintered product according to claim 1, in which $P_2O_5 < 1\%$ and/or $V_2O_5 < 1\%$ and/or $Al_2O_3 < 1\%$ and/or $CaO < 0.1\%$ and/or $Fe_2O_3 < 0.2\%$.

17. Sintered product according to claim 16, in which $P_2O_5 < 0.3\%$ and/or $V_2O_5 < 0.3\%$ and/or $CaO < 0.05\%$ and/or $Fe_2O_3 < 0.1\%$.

18. Sintered product according to claim 1, obtained from a starting charge having a zircon content greater than or equal to 80%, as a percentage by weight on the basis of the oxides.

19. Sintered product according to claim 18, obtained from a starting charge having a zircon content greater than or equal to 95%, as a percentage by weight on the basis of the oxides.

20. Sintered product according to claim 1, obtained from a starting charge in which no $Y_2O_3$ has been added.

21. Sintered product according to claim 1 in the form of a block presenting at least one dimension which is greater than 100 mm.

22. Sintered product according to claim 21, all the dimensions of said block are greater than 100 mm.

23. Sintered product according to claim 1, having a zirconia content of greater than 5% and less than 15%, in percentages by weight on the basis of the oxides.

24. Sintered product according to claim 1, having zirconia at least partially stabilized by yttrium oxide, the percentage by weight of stabilized zirconia being greater than 10% of the zirconia.

25. Process for manufacturing a sintered product comprising the following steps:
   a) raw materials are mixed to form a starting charge;
   b) a green part is formed from said starting charge; and
   c) said green part is sintered so as to obtain said sintered product,
   wherein the starting charge is determined in such a way that said product is in accordance with claim 1.

26. Process according to claim 25, in which, in step a) one or more of the oxides $Nb_2O_5$ and $Ta_2O_5$ are intentionally added in amounts guaranteeing that the sintered product obtained in step c) has the following average chemical composition by weight being based on the oxides:
   $60\% < ZrO_2 + HfO_2 < 75\%$;
   $27\% < SiO_2 < 34\%$;
   $0 < TiO_2$;
   $0 < Y_2O_3 < 3.5\%$;
   $0.1\% < Nb_2O_5 + Ta_2O_5 < 5\%$; and
   other oxides: $< 1.5\%$;
   for a total of 100%.

27. Process according to claim 25, in which monoclinic zirconia is added in step a).

28. Manufacturing process according to claim 25, in which no yttrium oxide not associated with zirconia is added in step a).

29. Process according to claim 25, in which zircon and optionally zirconia are added in step a) in amounts such that the total of the zircon and zirconia contents represents at least 95% of the starting charge as a percentage of the weight on the basis of the oxides.

30. Process according to claim 25, in which at least 1% silica is added in step a) to the starting charge as a percentage by weight on the basis on the oxides.

31. Glass furnace comprising a refractory product according to claim 1.

32. Sintered product according to claim 1 containing 99.45% or less of zircon.

33. Sintered product according to claim 1 containg 99% or less of zircon.

34. Sintered product according to claim 1, in which the total content of the oxides $Nb_2O_5$ and $Ta_2O_5$ is greater than 0.2% and less than 2%, in percentages by weight on the basis of the oxides.

* * * * *

UNITED STATES PATENT AND TRADEMARK OFFICE
CERTIFICATE OF CORRECTION

| | | |
|---|---|---|
| PATENT NO. | : 8,236,719 B2 | Page 1 of 1 |
| APPLICATION NO. | : 12/442864 | |
| DATED | : August 7, 2012 | |
| INVENTOR(S) | : Olivier Citti et al. | |

It is certified that error appears in the above-identified patent and that said Letters Patent is hereby corrected as shown below:

On the Title page, item (73) Assignee should read

--Saint-Gobain Centre de Recherches et d'Etudes Europeen--.

At column 8, line 48, claim 1, "75 or more" should be --75% or more--.

Signed and Sealed this
Second Day of October, 2012

David J. Kappos
*Director of the United States Patent and Trademark Office*